(12) United States Patent
Koch et al.

(10) Patent No.: US 9,477,917 B1
(45) Date of Patent: Oct. 25, 2016

(54) SYSTEM AND METHOD OF CONTEXT SPECIFIC IDENTITY IN A RADIO FREQUENCY IDENTITY (RFID) CHIP

(71) Applicant: Sprint Communications Company L.P., Overland Park, KS (US)

(72) Inventors: Thomas M. Koch, Olathe, KS (US); Gary D. Koller, Overland Park, KS (US); Mark D. Peden, Olathe, KS (US); Raymond E. Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 71 days.

(21) Appl. No.: 14/277,045

(22) Filed: May 14, 2014

(51) Int. Cl.
*H04Q 5/22* (2006.01)
*G06K 17/00* (2006.01)
*G06K 7/10* (2006.01)

(52) U.S. Cl.
CPC ....... *G06K 17/0022* (2013.01); *G06K 7/10297* (2013.01)

(58) Field of Classification Search
CPC .............. G06K 17/0022; G06K 7/10297
USPC ............................................. 340/10.52
See application file for complete search history.

(56) References Cited

U.S. PATENT DOCUMENTS

| | | | | |
|---|---|---|---|---|
| 4,377,741 A * | 3/1983 | Brekka | ............. | G06K 7/10881 235/432 |
| 2003/0006633 A1* | 1/2003 | Clothier | ............. | A47C 1/12 297/180.12 |
| 2004/0027243 A1* | 2/2004 | Carrender | ............. | G01C 21/20 340/568.1 |
| 2005/0234778 A1* | 10/2005 | Sperduti | ............. | G06Q 20/20 705/22 |
| 2007/0188306 A1* | 8/2007 | Tethrake | ............. | G06K 5/00 340/10.51 |
| 2007/0297378 A1* | 12/2007 | Poyhonen | ............. | H04W 48/18 370/338 |
| 2008/0048021 A1* | 2/2008 | Shieh | ............. | G06Q 10/02 235/380 |
| 2008/0108261 A1* | 5/2008 | Swan | ............. | G06Q 10/087 441/89 |
| 2008/0136599 A1* | 6/2008 | Sugano | ............. | G06K 7/0008 340/10.1 |
| 2009/0326685 A1* | 12/2009 | Meixner | ............. | G05B 19/042 700/83 |
| 2010/0093428 A1* | 4/2010 | Mattice | ............. | G07F 17/3251 463/25 |
| 2011/0298593 A1* | 12/2011 | Sugiyama | ............. | G06K 7/10009 340/10.51 |

* cited by examiner

*Primary Examiner* — Hai Phan
*Assistant Examiner* — Royit Yu (57) ABSTRACT

An electronic device. The device comprises a rewritable radio-frequency identification (RFID) tag to store an identification number and to transmit the identification number via a radio transmitter, an RFID writer, configured to write an identification number into the RFID tag based on selection by a controller, and a memory storing identification selection rules and a list of identities of RFID interrogators. The device further comprises a controller, configured to read the identity of the RFID interrogator from the RFID reader, analyze the identification selection rules and the list of identities of the RFID interrogators in the memory, select an identification number for the RFID tag based on the list of identities of the RFID interrogators, the identification selection rules stored in the memory, and the identity of the RFID interrogator, and command the RFID writer to write the selected identification number into the RFID tag.

18 Claims, 7 Drawing Sheets

SYSTEM AND METHOD OF CONTEXT SPECIFIC IDENTITY IN A RADIO FREQUENCY IDENTITY (RFID) CHIP

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Radio-frequency identification (RFID) tags contain electronically stored information. The RFID technology has been used for years for the purposes of automatically identifying and tracking tags attached to objects, and hence to track the objects themselves (e.g. inventory, stock). Some RFID tags are powered by and read at short distances, for example a few meters, via electromagnetic induction, and act as a passive transponder. Other RFID tags may utilize a local power source, for example a battery, and may transmit radio signals comprising stored information. An RFID reading device can be either passive or active.

SUMMARY

In an embodiment, an electronic device is disclosed. The electronic device comprises a rewritable radio-frequency identification (RFID) tag to store an identification number and to transmit the identification number via a radio transmitter, an RFID reader to read an identity transmitted by an RFID interrogator, an RFID writer, configured to write an identification number into the RFID tag based on selection by a controller, and a memory storing identification selection rules and a list of identities of RFID interrogators. The electronic device further comprises a controller, configured to read the identity of the RFID interrogator from the RFID reader, analyze the identification selection rules and the list of identities of the RFID interrogators in the memory, select an identification number for the RFID tag based on the list of identities of the RFID interrogators, the identification selection rules stored in the memory, and the identity of the RFID interrogator, and command the RFID writer to write the selected identification number into the RFID tag.

In an embodiment, a method of dynamically assigning an identification number to a rewritable radio-frequency identification (RFID) tag on an electronic device is disclosed. The method comprises storing identification selection rules and a list of identities of RFID interrogators, transmitting, by an RFID reader, a radio signal to read an identity of an RFID interrogator that is configured to read an identification number of the RFID tag, obtaining, by a controller, the identity information of the RFID interrogator from the RFID reader, and obtaining, by the controller, current location information of the electronic device. The method further comprises processing the identification selection rules and the list of identities of RFID interrogators, selecting an identification number for the RFID tag based on the list of the identities of the RFID interrogators, the identification selection rules stored, the identity of the RFID interrogator, and the location information, writing, by an RFID writer, the selected identification number into the RFID tag, and transmitting, by the RFID tag, a radio signal comprising the newly written identification number.

In an embodiment, a method of dynamically assigning an identification number to a rewritable radio-frequency identification (RFID) tag on an electronic device is disclosed. The method comprises storing identification selection rules and identity information of RFID interrogators, reading, by an RFID reader, identity of an RFID interrogator that is configured to receive a radio signal comprising an identification number of the RFID tag, selecting an identification number for the RFID tag based on the list of identities of the RFID interrogators, the identification selection rules, and the identity of the RFID interrogator, and assigning the selected identification number to the RFID tag.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Current radio-frequency identification (RFID) tags used in the near field communication (NFC) domain present a single identity to NFC/RFID reading devices. A user of an electronic device with an RFID tag may desire to indicate different identities with the same RFID tag under different circumstances, for example to present different identities to different reading devices and/or in different contexts. The present disclosure teaches a system and method for dynamically assigning an identity to an RFID tag coupled to an electronic device under predefined circumstances.

For example, when an RFID interrogator transmits a radio signal to read the identification information from an RFID tag of an electronic device, a controller application on the electronic device may be notified. An RFID interrogator may refer to a NFC/RFID reading device herein, for example a hand-held RFID scanner that may be used for identifying inventory or a RFID badge reader mounted at a building entrance. The controller may command an RFID reader that is coupled to the electronic device to transmit a request to the RFID interrogator to transmit identity information that identifies the RFID interrogator. When the identity information of the RFID interrogator is received, the RFID reader may process the identity information. The controller may obtain the identity of the RFID interrogator from the RFID reader.

Identification selection rules and a list of relevant identities of RFID interrogators may be stored in a memory of the electronic device or in a memory of the RFID tag. Mapping between the identity of the RFID interrogator and an identification number of the RFID tag may also be stored in the memory. The controller may select the proper identification for the RFID tag based on the identity of the RFID interrogator, the identification selection rules, and/or the list of relevant identities of RFID interrogators. Context information may also be analyzed by the controller to select the identification for the RFID tag, for example location information of the RFID tag, date, and/or time of day. An RFID writer application may write the selected identification number into the RFID tag. The RFID tag may then transmit a radio signal comprising the newly written identification number. This may be referred to as context specific identity in an RFID tag.

Figure 1:
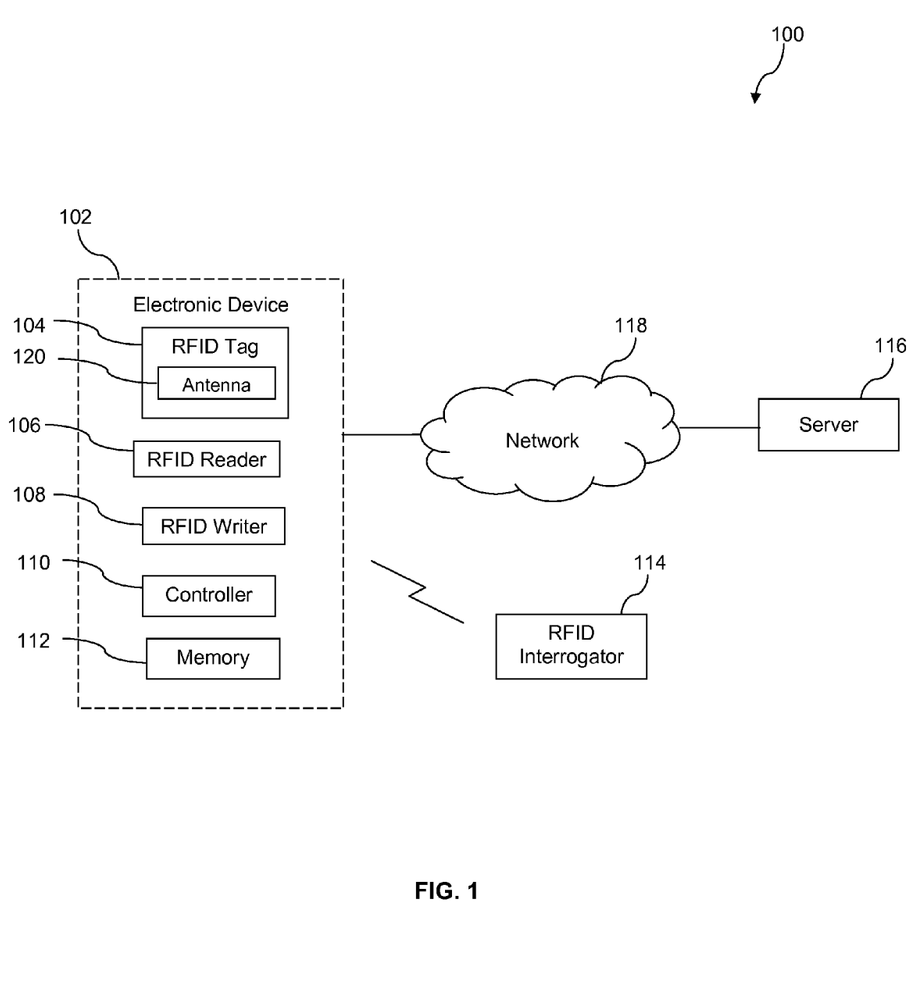
FIG. 1 is an illustration of a communication system according to an embodiment of the disclosure.

Turning now to FIG. 1, a communication system 100 is described. In an embodiment, the communication system 100 comprises a plurality of electronic devices 102, a plurality of radio-frequency identification (RFID) integrators 114, and a server 116. The electronic device 102 may comprise an RFID tag 104, an RFID reader 106, an RFID writer application 108, a controller application 110, and a memory 112. The electronic device 102 may be coupled to a network 118, for example a mobile communication device configured to use a radio transceiver to be communicatively coupled to a network 118 operated by a network service provider through a base transceiver station. In an embodiment, the electronic device 102 may be coupled to the network 118 by a wire, for example during programming and/or configuration at an original equipment manufacturer (OEM). A server 116 may also have access to the network 118. The network 118 may comprise any combination of private and public networks.

It is understood that the system 100 may comprise any number of electronic devices 102, any number of servers 116, and any number of RFID interrogators 114. The electronic device 102 may be any of a mobile phone, a personal digital assistant (PDA), a mobile watch phone, a media player, a laptop computer, a notebook computer, a tablet computer, a refrigerator, a motor vehicle, a pacemaker, or another RFID capable device. The RFID interrogator 114 may be any of a near field communication (NFC) reading device or an RFID reading device. The electronic device 102 may exchange identification information with the RFID interrogator 114 using RFID protocols and/or other radio communication protocols.

The RFID tag 104 may be an RFID tag attached to or embedded in the electronic device 102. For example, if the electronic device 102 is a head unit or a telematics unit in a motor vehicle, the RFID tag 104 may be attached to the motor vehicle. Alternatively, if the electronic device 102 is a mobile communication device, the RFID tag 104 may be embedded on the mobile communication device, for example on the motherboard of the mobile communication device, or concealed under a button. An RFID tag 104 may store identification information and/or other information. The identification information stored in the RFID tag 104 may be an identification number or code, for example a loyalty reward account number, a toll tag number, a credit card number, a building pass number, a parking permit number, a driver's license number, or another type of identification number. The RFID tag 104 may also store encrypted information such as keys, for example a car key. The RFID tag 104 may start a car with the stored car key information.

The RFID tag 104 may transmit a radio signal comprising identification number and/or other information under predefined circumstances. For example, when an authorized RFID interrogator 114 requests the RFID tag 104 for its identification number, the RFID tag 104 may transmit a radio signal comprising a stored corresponding identification number and/or other information. As another example, when the RFID tag 104 is requested to transmit a radio signal by an internal component of the electronic device 102, the RFID tag 104 may transmit a radio signal comprising stored identification number and/or other information.

In an embodiment, the RFID tag 104 may be an RFID tag used in the near field communication (NFC) domain, for example a high-frequency (HF) RFID tag that operates with near field communication interrogators or RFID interrogators 114. The RFID tag 104 may comprise an antenna 120 and an integrated circuit. The integrated circuit may store and/or process information, modulate, and demodulate a radio frequency (RF) signal, collect power from an incident interrogator signal, or perform other functionality. The antenna 120 may receive and/or transmit radio frequency signals. In another embodiment, the RFID tag 104 may comprise more complex computational component(s), for example a memory and/or a central processing unit (CPU).

Under different circumstances, different identification numbers may be assigned to the RFID tag 104. However, at any given time, only one identification number may be stored in the RFID tag 104. For example, the RFID tag 104 may be assigned with a meaningless value as the default value before the identity of the RFID interrogator 114 is determined and an identification number is selected for the RFID tag 104. Alternatively, the RFID tag 104 may be configured to not respond to the RFID interrogator 114 as default before the identity of the RFID interrogator 114 is determined and an identification number is selected for the RFID tag 104. In this case, the RFID tag 104 may be configured to only respond to the RFID interrogator 114 when a command from inside the electronic device 102 is sent to the RFID tag 104, for example a transmit identification command from the controller 110.

When circumstances change, the identification number of the RFID tag 104 may be changed accordingly using predefined rules. For example, an identification number for the RFID tag 104 may be selected based on location, time, day, and/or the identity of an RFID interrogator 114. For example, the identification number assigned to the RFID tag 104 at a point-of-sale (POS) terminal from a first vender may be different from the identification number assigned to the RFID tag 104 at another point-of-sale terminal for a second vender. When the RFID tag 104 physically travels from the point-of-sale terminal of the first vender to the point-of-sale terminal of the second vender, the identification number stored in the RFID tag 104 may be changed, for example by overwriting the previous identification number for the first vender with the new identification number for the second vender. The new identification number may be written to the RFID tag 104 by the RFID writer 108.

When the electronic device 102 is physically across a geo boundary, the identification number of the RFID tag 104 may be set to a default value, for example a meaningless value. A geo boundary may be a virtual perimeter for physical geographic areas, for example for various brands, stores, companies, or another type of entities. When the electronic device 102 is physically close to an RFID interrogator 114, for example within 0.5 meter, 0.2 meter, or another distance of the RFID interrogator 114, a corresponding identification number may be dynamically written to the RFID tag 104 after the identification number is selected. Alternatively, a user of the electronic device 102 may select an identification number to be stored in the RFID tag 104 at any time. The user may achieve this by invoking a function to write an identification number to the RFID tag 104, for example by invoking the controller 110.

The RFID reader 106 may be a software application and may be stored in a memory of the electronic device 102 or in a memory of the RFID tag 104. Alternatively, the RFID reader 106 may be a piece of hardware that implements functionality of reading identity information from an RFID interrogator 114. When executed by a processor of the electronic device 102 or a processor of the RFID tag 104, the RFID reader 106 may read identity and/or other information from an RFID interrogator 114. For example, after receiving a command from the controller 110, the RFID reader 106 may attempt to read the identity of an RFID interrogator 114 that transmits a radio signal to read the identification information from the RFID tag 104. For example, when the RFID interrogator 114 transmits a radio signal to read the identification number from the RFID tag 104, the controller 110 may be notified of the attempt of the RFID interrogator 114. The controller 110 may then send a command to the RFID reader 106 to read the identity of the RFID interrogator 114.

Upon receipt of the command to read the identity of the RFID interrogator 114, the RFID reader 106 may request the antenna 120 to transmit radio signals to invoke identity signal transmission from the RFID interrogator 114 or to request the RFID interrogator 114 to transmit identity information that identifies the RFID interrogator 114. When an identity signal from the RFID interrogator 114 is received at the electronic device 102, the RFID reader 106 may process the received identity information from the RFID interrogator 114 and may transmit the processed identity information to the controller 110. Alternatively, the RFID interrogator 114 may be an active interrogator and may periodically transmit interrogator signals with its identity. In this case, the RFID reader 106 may simply process the identity signal and transmit the processed identity information to the controller 110 instead of transmitting radio signals to invoke identity transmission from the RFID interrogator 114.

The RFID writer 108 may be stored in a memory of the electronic device 102. Alternatively, the RFID writer 108 may be stored in a memory of the RFID tag 104. When executed by a processor of the electronic device 102 or a processor of the RFID tag 104, the RFID writer 108 may write identification and/or other information to an RFID tag 104. For example, after receiving a command from the controller 110, the RFID writer 108 may write an identification number to the RFID tag 104. For example, when an identification number is selected for the RFID tag 104, the controller 110 may send a command with the selected identification number to the RFID writer 108. The RFID writer 108 may then write the selected identification number to the RFID tag 104.

A user of the electronic device 102 may be registered with a server 116, for example with a specific user account number. The server 116 may update the stored identification selections rules and/or list of RFID interrogators 114 in the memory 112. A user may register more than one electronic device with the server 116 under the same user account. In an embodiment, the server 116 may apply the same set of rules for assigning identification numbers to RFID tags 104 in all the registered devices 102 of the same user account. The server 116 may apply a matching and encryption method to enforce authenticity and authorization to limit impersonation when unauthorized devices try to program RFID tags 104.

The controller 110 may be stored in a memory of the electronic device 102. Alternatively, the controller 110 may be stored in a memory of the RFID tag 104. When executed by a processor of the electronic device 102 or a processor of the RFID tag 104, the controller 110 may manage and/or manipulate RFID components of the electronic device 102 to complete reading, writing, or another type of RFID related process. For example, the controller 110 may manage the RFID tag 104 and/or the RFID reader 106 to complete a reading process in order to read the identity of an RFID interrogator 114.

When an RFID interrogator 114 transmits a radio signal to read the identification information of the RFID tag 104, the controller 110 may be notified of the attempt of the RFID interrogator 114, for example by the RFID tag 104. The controller 110 may send a command to the RFID reader 106 to read the identity information from the RFID interrogator 114. After the identity information of the RFID interrogator 114 is processed by the RFID reader 106, the controller 110 may obtain the identity of the RFID interrogator 114 from the RFID reader 106. The controller 110 may then analyze the identity of the RFID interrogator 114 with the identification selection rules and/or a list of identities of RFID interrogators 114. The identification selection rules or the list of identities of RFID interrogators 114 may be stored in the memory 112.

For example, a mapping between an identification number of the RFID tag 104 and a corresponding RFID interrogator 114 identity may be stored in the memory 112 with predefined identification selection rules. Based on the identification selection rules, the list of identities of the RFID interrogators 114, and/or the identity of the RFID interrogator 114, the controller 110 may select an identification number for the RFID tag 104. The controller 110 may command the RFID writer 108 to write the selected identification number into the RFID tag 104, for example by sending a command to the RFID writer 108 with the selected identification number. The RFID tag 104 may transmit the newly written identification number, for example after being invoked by radio signals from the RFID interrogator 114 or upon receipt of a command from the controller 110 to transmit a radio signal comprising its identification number.

Figure 2:
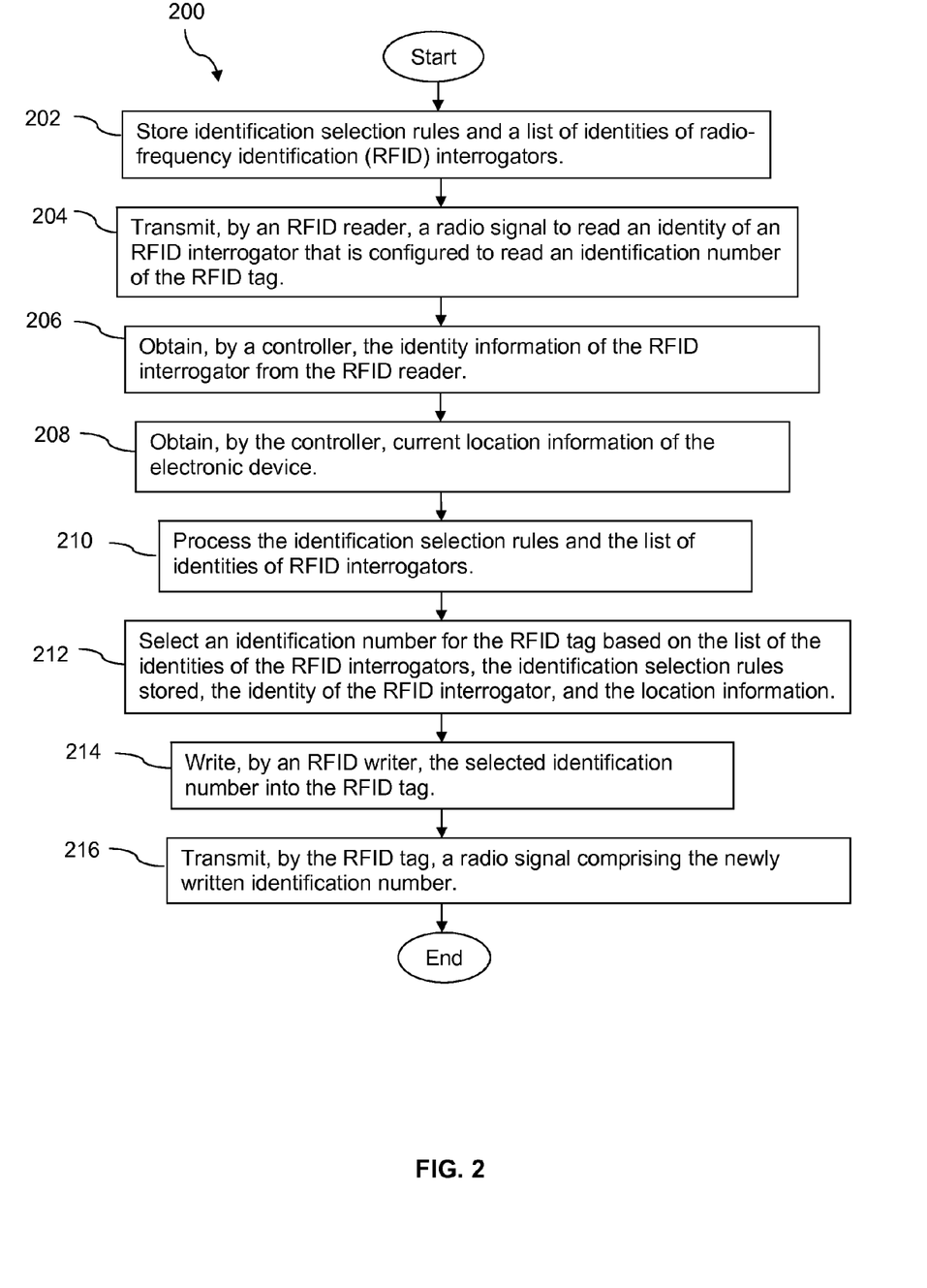
FIG. 2 is a flow chart illustrating a method according to an embodiment of the disclosure.

Turning now to FIG. 2, a method 200 is described. At block 202, identification selection rules and a list of identities of RFID interrogators are stored. For example, identification selection rules for the RFID tag 104 and/or a list of identities of RFID interrogators 114 may be stored in the memory 112 of the electronic device 102 or a memory of the RFID tag 104. The list of identities of RFID interrogators 114 may comprise identities of relevant RFID interrogators 114 that may request identification information from the RFID tag 104. The identification selection rules may comprise identification selection preferences, identification selection preferences filters, or other identification selection rules.

For example, with the same RFID interrogator 114 identity, an identification selection rule may determine an identification number for the RFID tag 104 based on the time or the day when the selection is processed. The identification selection rule may determine an identification number for the RFID tag 104 based on the location of the RFID tag 104 at the time for selecting an identification number. Additionally, the identification selection rule may determine an identification number for the RFID tag 104 based on another type of factor. For example, the identification selection rule may select a first identification number for the RFID tag 104 in the daytime and a second identification number for the RFID tag 104 at night when the same identity of the RFID interrogator 114 is located in the list of identities of the RFID interrogators 114.

At block 204, a radio signal is transmitted by an RFID reader to read an identity of an RFID interrogator that is configured to read an identification number of the RFID tag. For example, when an RFID interrogator 114 transmits a radio signal to read identification information, for example an identification number, from an RFID tag 104, a radio signal may be transmitted by the RFID reader 106 to read the identity of the RFID interrogator 114. The RFID reader 106 may achieve this by sending a request to the antenna 120 of the RFID tag 104 so that the antenna 120 may transmit a radio signal to invoke the RFID interrogator 114. The invoked RFID interrogator 114 may transmit a radio signal comprising its identity information and/or other information. At block 206, the identity information of the RFID interrogator is obtained by a controller from the RFID reader. For example, when the identity information of the RFID interrogator 114 is received, the reader 106 may obtain and may process the identity information. The controller 110 may obtain the identity information from the RFID reader 106.

At block 208, current location information of the electronic device is obtained by the controller. The current location of the electronic device 102 may be determined in a variety of ways. For example, the locating process may be accomplished in a network-based manner, in a handset-based manner, in a hybrid manner that involves both the network-based technologies and handset-based technologies, or in another manner for device localization. With any of the localization method, the controller 110 may obtain the current location information from a corresponding application on the electronic device 102.

At block 210, the identification selection rules and the list of identities of RFID interrogators are processed. For example, the identification selection rules and the list of identities of RFID interrogators 114 stored in the memory 112 may be processed by the controller 110. In an embodiment, the identity of the RFID interrogator 114 that transmitted a radio signal to read the identification information of the RFID tag 104 may be analyzed with the identification selection rules, the list of identities of RFID interrogators 114, and/or the location information by the controller 110. When the identity of the RFID interrogator 114 is not located in the list of RFID interrogators 114, or after a predefined period of time without receiving an identity from the RFID interrogator 114, the controller 110 may determine that the RFID interrogator 114 may lack an identity. In this case, the controller may take no further action. This means the RFID tag 104 may continue not responding to the RFID interrogator 114 or may respond to the RFID interrogator 114 with an invalid value or with a transponder ID (TID). The transponder ID may identity the model and/or manufacturer of the RFID tag but does not comprise data or information about an object to which the RFID tag 104 is associated. In some cases, transponder IDs may be serialized and hence different from a first RFID tag 104 to a second RFID tag 104. It will be appreciated, however, that knowing the serialized transponder ID of the RFID tag 104 may not provide the information the RFID interrogator 114 may desire to process.

At block 212, an identification number for the RFID tag is selected based on the list of the identities of the RFID interrogators, the identification selection rules, the identity of the RFID interrogator, and/or the location information. For example, when the identity of the RFID interrogator 114 is located in the list of the RFID interrogators 114, an identification number may be selected for the RFID tag 104 based on the list of the identities of the RFID interrogators 114, the identification selection rules, the identity of the RFID interrogator 114, and/or the location information by the controller 110. With the list of the identities of the RFID interrogators 114, the identification selection rules, the identity of the RFID interrogator 114, the location information, and/or the mapping information stored in the memory 112, the controller 110 may select the proper identification number for the RFID tag 104.

For example, if the identity of the RFID interrogator 114 is found in the list of the RFID interrogators 114, it may mean the identity of the RFID interrogator 114 is relevant and the RFID tag 104 may respond to the RFID interrogator 114 with its identification information and/or other information. Mapping between RFID tag 104 identification number(s) and identity(ies) of RFID interrogator(s) 114 may be stored in the memory 112. The mapping may be a one-to-one mapping, a one-to-many mapping, or a many-to-one mapping. For example, an RFID tag 104 identification number may correspond to only one specific RFID interrogator 114 identity. One RFID tag 104 identification number may correspond to multiple RFID interrogator 114 identities. Additionally, multiple RFID tag 104 identification numbers may correspond to one RFID interrogator 114 identity.

For example, if each of McDonald's point-of-sale RFID interrogators 114 has one and the same identity, for example an identity number, one identification number for the RFID tag 104 may be mapped. As another case, one and the same identification number for the RFID tag 104 may be mapped for any of a group of McDonald's point-of-sale RFID interrogators 114 while each of the McDonald's point-of-sale RFID interrogators 114 has an individual RFID identity.

When any of a group of RFID interrogators 114 has one and the same identity number, a group of identification numbers may be mapped for the RFID tag 104 first. For example, multiple RFID interrogators 114 for access to a building may have the same identity number. With that same identity number, a subgroup of identification numbers out of all available identification numbers for the RFID tag 104 may be mapped. Mapping results may be further processed with other information, for example context information. For example, the location information may be utilized here to determine only one proper identification number from the subgroup of identification numbers for the RFID tag 104. For example, with the location information, the exact RFID interrogator 114 may be determined, and a corresponding identification number may be selected for the RFID tag 104.

Personnel that have access to the building gate may not have access to some office(s) and this may be realized by involving location information of the RFID tag 104.

At block 214, the selected identification number is written by an RFID writer into the RFID tag. For example, the controller 110 may send a request to the RFID writer 108 with the selected identification number for the RFID tag 104, and the RFID writer 108 may write the selected identification number into the RFID tag 104. At block 216, a radio signal is transmitted by the RFID tag comprising the newly written identification number. For example, a radio signal may be transmitted by the antenna 120 of the RFID tag 104 comprising the newly written identification number. The RFID interrogator 114 may then receive the identification information of the RFID tag 104 and further action may be taken by the RFID interrogator 114 party to complete a task or a transaction between the RFID interrogator 114 party and the RFID tag 104 party.

Figure 3:
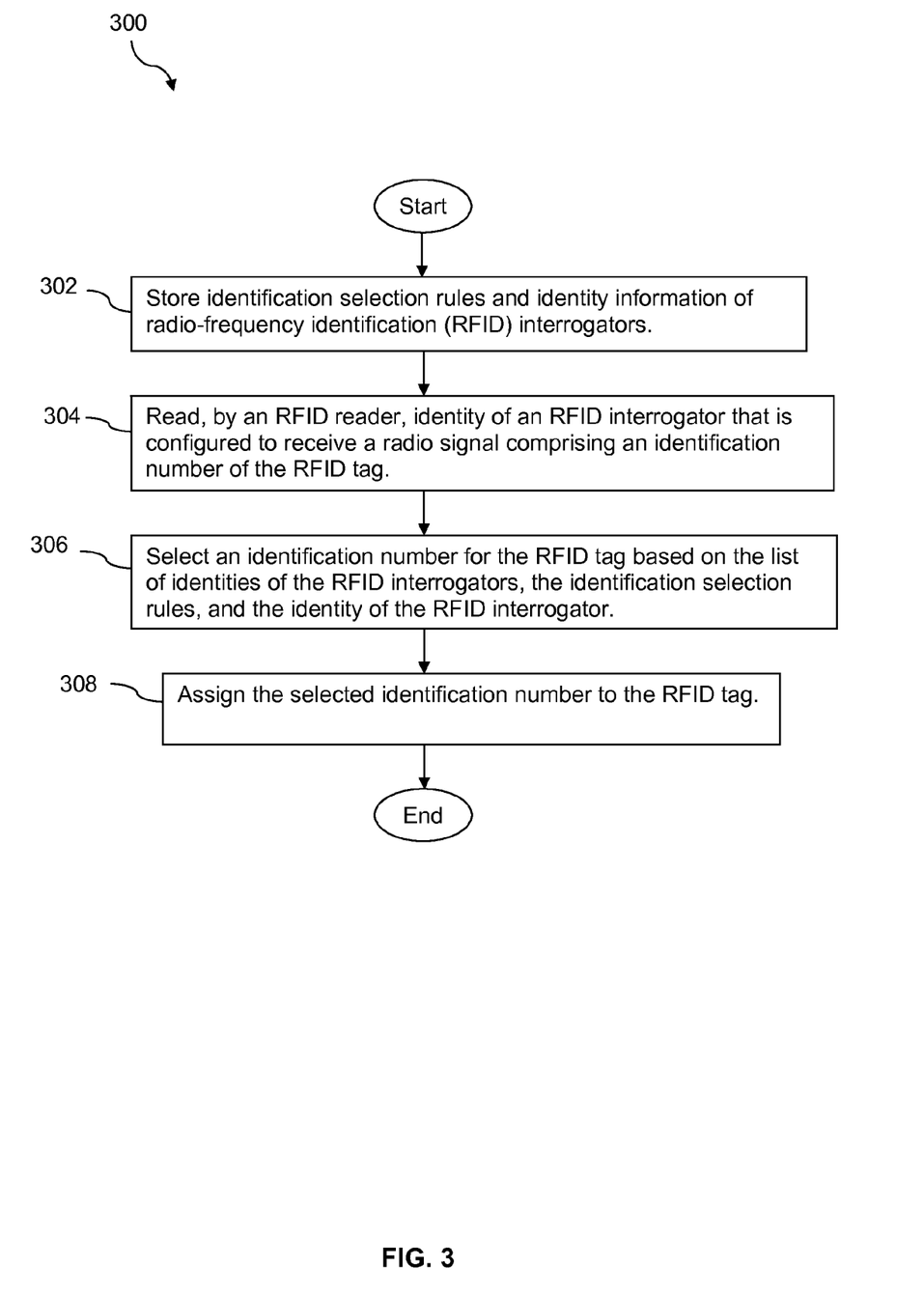
FIG. 3 is a flow chart illustrating another method according to an embodiment of the disclosure.

Turning now to FIG. 3, a method 300 is described. At block 302, identification selection rules and identity information of RFID interrogators are stored. For example the identification selection rules and/or the identity information of RFID interrogators 114 may be stored in the memory 112. At block 304, identity of an RFID interrogator that is configured to receive a radio signal comprising an identification number of the RFID tag is read by an RFID reader. For example, the identity of the RFID interrogator 114 that is configured to receive a radio signal comprising an identification number of the RFID tag 104 may be read by the RFID reader 106. At block 306, an identification number is selected for the RFID tag 104 based on the list of identities of the RFID interrogators 114, the identification selection rules, and the identity of the RFID interrogator 114. At block 308, the selected identification number is assigned to the RFID tag 104.

Figure 4:
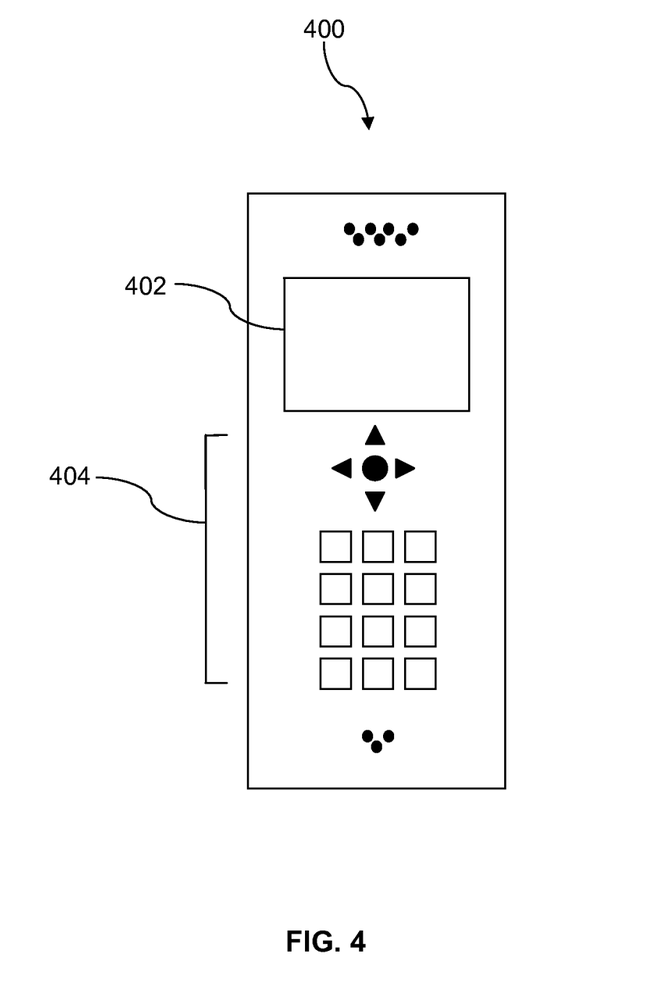
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
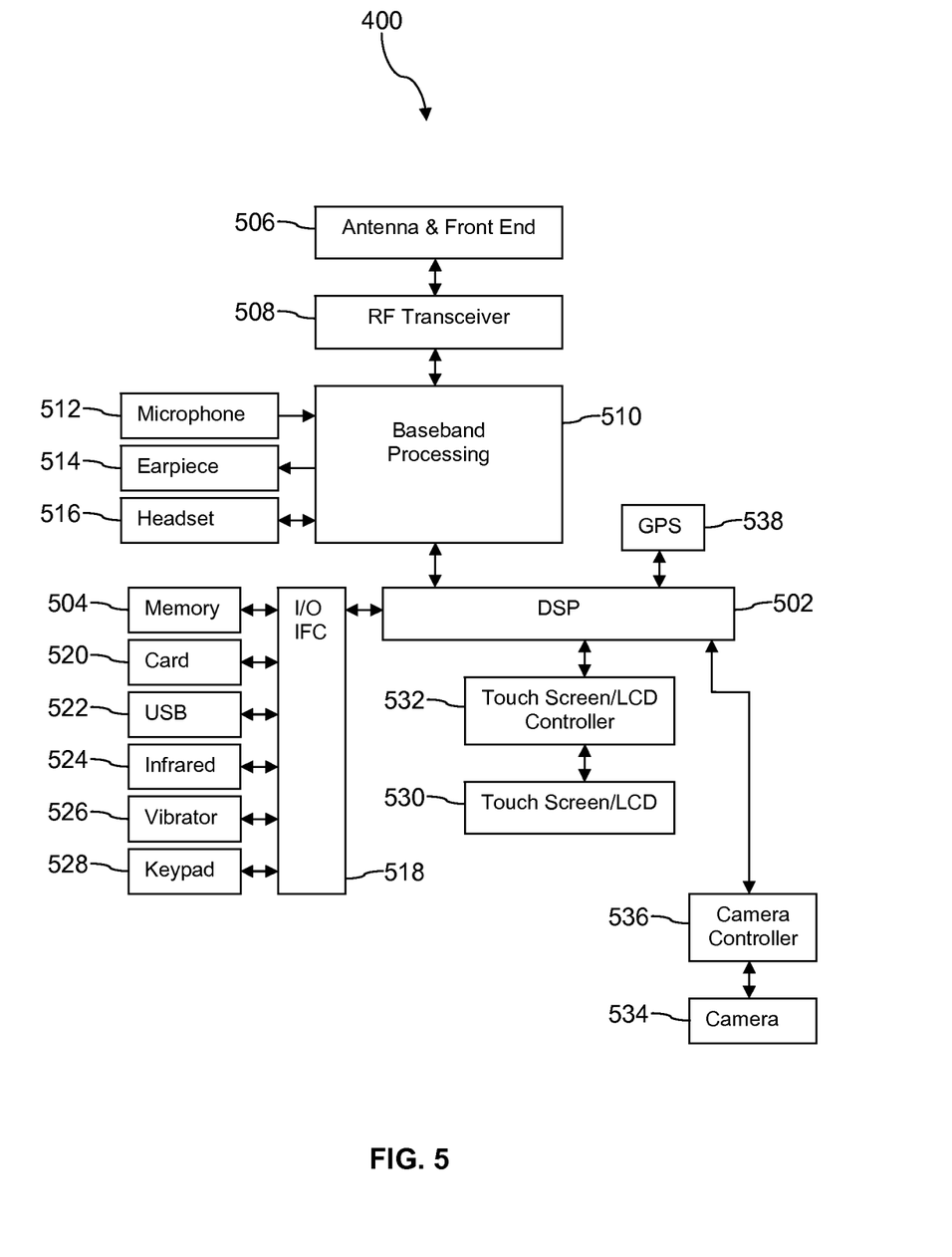
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
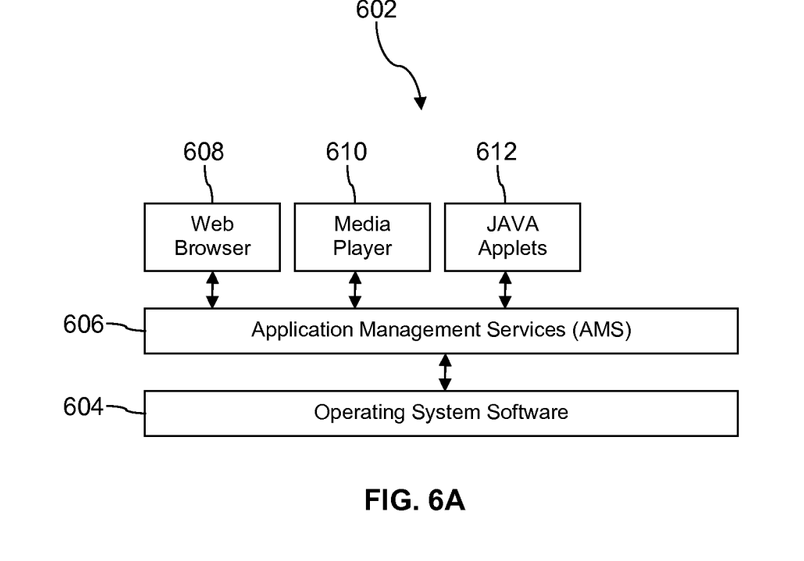
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
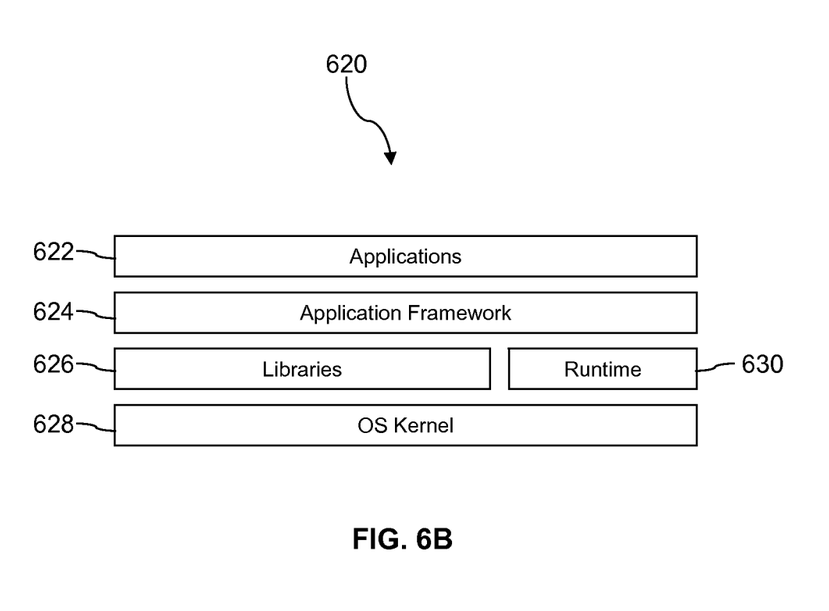
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
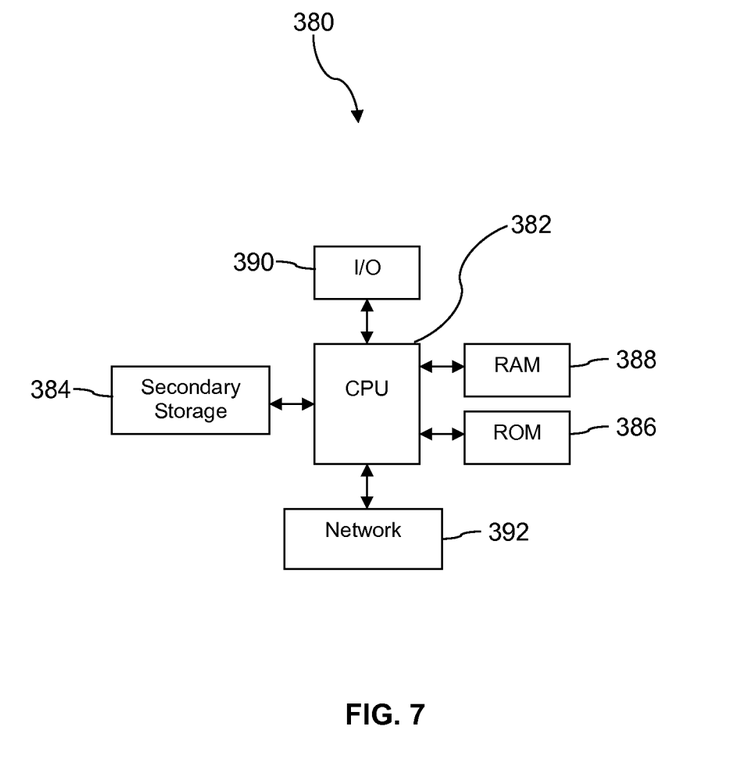
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. An electronic device, comprising:
a rewritable radio-frequency identification (RFID) tag that is configured to store and transmit an identification number via an antenna;
an RFID reader configured to read an identity transmitted by an RFID interrogator external to the electronic device;
an RFID writer configured to write the identification number into the RFID tag based on a command from a controller of the electronic device;
a memory storing identification selection rules and a list of identities of RFID interrogators; and
the controller of the electronic device, configured to:
read, from the RFID reader, the identity of the RFID interrogator that is external to the electronic device,
analyze the identification selection rules and the list of identities of the RFID interrogators in the memory based on the identity of the RFID interrogator,
determine that the identity of the RFID interrogator does not correspond with a current identification number stored in the rewritable RFID tag,
in response to the determination, select, for transmission by the rewritable RFID tag, an identification number corresponding to the RFID interrogator from the list of identities of the RFID interrogators based on the identification selection rules stored in the memory and the identity of the RFID interrogator, command the RFID writer to dynamically write the selected identification number into the RFID tag prior to transmission of the selected identification number to the RFID interrogator, and command the RFID tag to transmit the selected identification number to the RFID interrogator after being dynamically written to the RFID tag by the RFID writer.

2. The electronic device of claim 1, wherein only one identification number is stored in the RFID tag for transmission.

3. The electronic device of claim 1, wherein the RFID tag is assigned a value as default as the current identification number before the identity of the RFID interrogator is determined and the identification number corresponding to the RFID interrogator is selected for the RFID tag.

4. The electronic device of claim 1, wherein the RFID tag is configured, by default, to not respond with a transmission of the current identification number to the RFID interrogator before the identity of the RFID interrogator is read and the identification number corresponding to the RFID interrogator is selected for the RFID tag.

5. The electronic device of claim 4, wherein the RFID tag is configured to only respond to the RFID interrogator when a command from inside the electronic device is sent to the RFID tag.

6. The electronic device of claim 1, wherein the electronic device is at least one of a mobile phone, a personal digital assistant (PDA), a mobile watch phone, a media player, a laptop computer, a notebook computer, a tablet computer, a refrigerator, a motor vehicle, or a pacemaker.

7. The electronic device of claim 1, wherein the identification number of the RFID tag is one of a loyalty reward account number, a toll tag number, a credit card number, a building pass number, or a parking permit number, and wherein the RFID interrogator includes at least one of a near field communication (NFC) reading device or an RFID reading device.

8. A method of dynamically assigning an identification number to a rewritable radio-frequency identification (RFID) tag on an electronic device, comprising:
   storing, in a memory of the electronic device, identification selection rules and a list of identities of RFID interrogators;
   transmitting, by an RFID reader of the electronic device, a radio signal to elicit identity information of an RFID interrogator that is external to the electronic device and configured to read an identification number that is transmitted from the RFID tag;
   obtaining, by executing a controller of the electronic device, the identity information of the RFID interrogator via the RFID reader;
   obtaining, by the controller, current location information of the electronic device;
   processing, by the controller, the identification selection rules and the list of identities of RFID interrogators based on the identify information of the RFID interrogator;
   determining, by the controller, that the identity information of the RFID interrogator does not correspond with a current identification number stored in the rewritable RFID tag;
   in response to the determination, selecting, by executing the controller for transmission by the RFID tag, an identification number corresponding to the RFID interrogator from the list of the identities of the RFID interrogators, the identification selection rules stored, the identity of the RFID interrogator, and the location information;
   writing, by an RFID writer of the electronic device, the selected identification number into the RFID tag prior to transmission of the selected identification number to the RFID interrogator; and
   transmitting, by the RFID tag to the RFID interrogator, a radio signal comprising the selected identification number in response to the writing.

9. The method of claim 8, wherein the current identification number of the RFID tag is set to a default value responsive to the electronic device crossing a geo boundary.

10. The method of claim 9, wherein writing the selected identification number into the RFID tag is responsive to the electronic device being within a predefined distance from the RFID interrogator.

11. The method of claim 8, wherein the identification selection rules include identification selection filters for the controller to determine a particular identification number to select.

12. The method of claim 8, wherein obtaining the identity information of the RFID interrogator is based on the RFID reader receiving a radio signal from the RFID interrogator in response to the transmitting.

13. The method of claim 8, wherein selecting the identification number corresponding to the RFID interrogator is further based on input from a user of the electronic device.

14. The method of claim 8, wherein the identification selection rules used for selecting the identification number corresponding to the RFID interrogator are based on time and day.

15. The method of claim 8, wherein the processing includes mapping the identify information of the RFID interrogator to an identity in the list and determining at least one RFID tag identification number stored in the memory using the identification selection rules.

16. A method of dynamically assigning an identification number to a rewritable radio-frequency identification (RFID) tag on an electronic device, comprising:
   storing, in a memory of the electronic device, identification selection rules and identity information of RFID interrogators;
   reading, by an RFID reader of the electronic device, an identity of an RFID interrogator that is external to the electronic device and is configured to receive a radio signal comprising information from the RFID tag;
   determining, by a controller of the electronic device, that the identity of the RFID interrogator does not correspond with a current identification number stored in the rewritable RFID tag;
   selecting, by executing the controller, an identification number for the RFID tag to transmit to the RFID interrogator based on the list of identities of the RFID interrogators, the identification selection rules, and the identity of the RFID interrogator;
   assigning and dynamically writing, via an RFID writer of the electronic device, the selected identification number to the RFID tag; and
   commanding, by the controller of the electronic device, the RFID tag to transmit the selected identification number to the RFID interrogator after being selected and dynamically written to the RFID tag by the RFID writer.

17. The method of claim 16, wherein a plurality of electronic devices associated with a user of the electronic device are registered with a server under one user account.

18. The method of claim 17, wherein the server applies the same set of rules for assigning identification numbers to RFID tags of all the registered devices of the user.

\* \* \* \* \*